July 2, 1963  L. J. MOWRY ET AL  3,096,429
WELDING APPARATUS AND PROCESS
Filed March 30, 1961  2 Sheets-Sheet 1
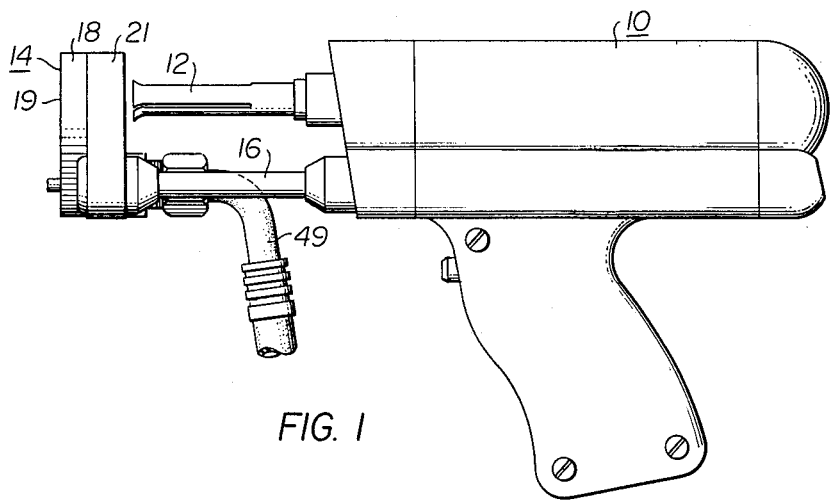
FIG. 1
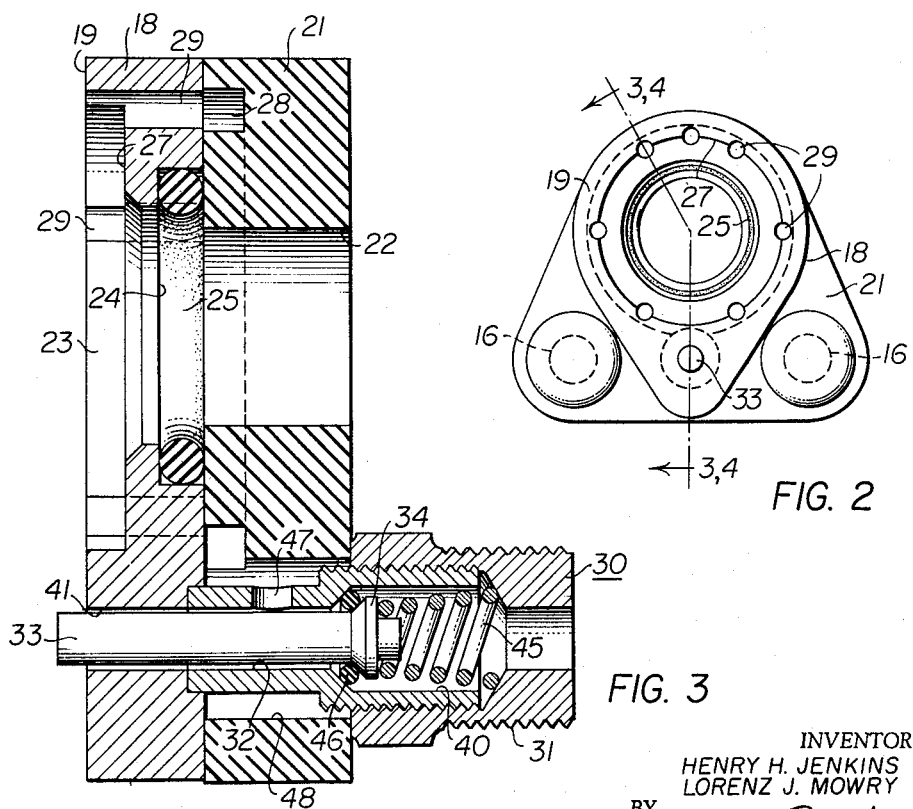
FIG. 2
FIG. 3
INVENTORS
HENRY H. JENKINS
LORENZ J. MOWRY
BY Watts Edgerton Pyle & Fisher
ATTORNEYS July 2, 1963  L. J. MOWRY ET AL  3,096,429
WELDING APPARATUS AND PROCESS
Filed March 30, 1961  2 Sheets-Sheet 2

INVENTOR.
HENRY H. JENKINS
LORENZ J. MOWRY
BY
ATTORNEYS

United States Patent Office 3,096,429
Patented July 2, 1963

3,096,429
WELDING APPARATUS AND PROCESS
Lorenz J. Mowry, Elyria, and Henry H. Jenkins, Amherst, Ohio, assignors to Gregory Industries, Inc., a corporation of Michigan
Filed Mar. 30, 1961, Ser. No. 99,588
12 Claims. (Cl. 219—98)

This invention relates in general to the art of drawn-arc welding, and in particular to the art of gas shielding of a welding arc, but relates more particularly to the process of producing a drawn-arc weld between aluminum members, and to a novel gas shielding device to carry out the process.

This application is a continuation-in-part of our application Serial No. 806,104 filed April 13, 1959, now abandoned.

End-arc welding of steel has now been in practice for many years, and has grown in use and acceptance, as well as quality of weld, particularly since 1940. There are various approaches to such welding technique, one of which produces an arc of very short duration and hence melts only a thin film of metal to unite the parts. Another produces a longer arc period, and hence a greater amount of metal is melted.

Non-ferrous metals present problems of a different nature than confronts ferrous welding. Aluminum, in particular, is difficult to weld because of its great affinity for oxygen. If the molten pool of aluminum is allowed to become oxidized, a very weak and useless weld will result.

To produce a sound drawn-arc weld, various gas shielding devices have been employed to flush out the natural atmosphere and produce an inert atmosphere. Some have been more successful than others; but none are known that produce the superior and consistent results which are achieved by the process and apparatus of this invention.

The principal object of this invention is to direct inert gas in a sweeping flow from all directions directly into the area of the arc, and then away from the arc area in a direction which will not disturb the in-flowing gas.

Another object of this invention is to provide an improvement in the process of welding by the drawn-arc technique, by enclosing the area of the weld arc, and then causing a sweeping purge of inert gas to flow through the enclosure in sufficient volume to assure full natural atmosphere removal and thereafter cause the arc drawing process to proceed while the sweeping flow of gas impinges upon the arc area from a peripheral source and moves laterally away in a direction transverse to the direction from the source.

Still another object of this invention is to provide apparatus which will shield the arc area and direct the flow of gas in the desired manner.

Yet another object of this invention is to provide apparatus which will house a base-vented ferrule as a part of the device, and in which the ferrule directs the gas along a workpiece surface in a sweeping flow and vents the area so enclosed by allowing the gas to escape upwardly around the weld workpiece as an escape port.

And still another object of this invention is to provide a flow control to cause the gas to flow prior to arc initiation, without an overt act of the operator and as a result of the operator's act of preparing a welding gun for the welding act.

Other objects and a fuller understanding of the invention may be had by referring to the following description and claims, taken in conjunction with the accompanying drawings, in which:

FIGURE 1 is a side elevational view of a welding gun designed to produce an end arc weld of a stud member, with a gas shield device incorporating the features of this invention carried thereby;

FIGURE 2 is a bottom view of the gas shielding and control structure carried by the gun in FIGURE 1;

FIGURE 3 is a section taken along line 3—3 of FIGURE 2;

Figure 4:
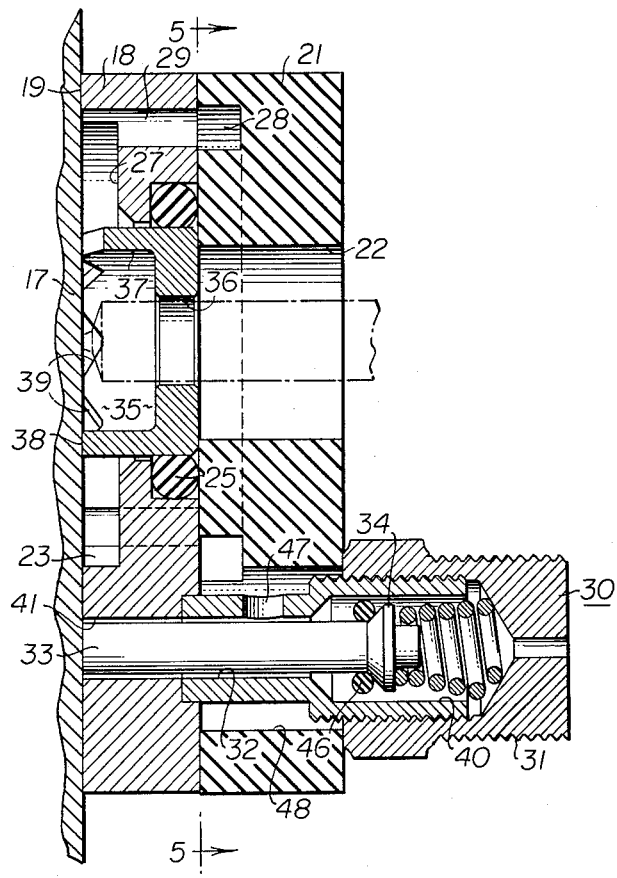
FIGURE 4 is an alternative embodiment employing a restricted gas passage orifice and is similar in all other respects to FIGURE 3 but with the device impressed upon a surface to actuate the valve control trigger and seal off the welding chamber; and, FIGURE 5 is a section through the device along line 5—5 of FIGURE 4, and is therefore a bottom view of the electrically non-conducting top portion.
Figure 5:
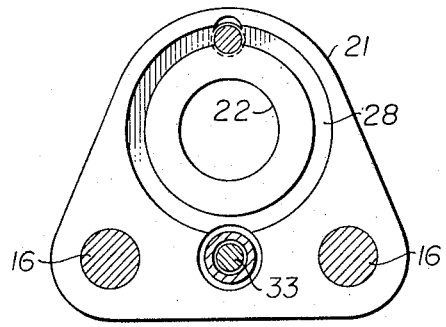

The FIGURE 1 is the side elevation of a commercial embodiment of a welding gun 10 with a stud holding chuck 12 adapted to hold a stud member for welding of that stud member to a plate or other suitable surface. The gun 10 and the chuck 12 are one of several available commercial devices which may be adapted for carrying for the process of the present invention, and to which the improved gas shield and directing device 14 may be attached. The gun 10 is designed to hold a stud in the chuck 12 and touch that stud to the surface to which it is to be welded. An electrical circuit is established through the gun and stud to the surface. Electrical current of relatively low amperage is caused to flow through the circuit as the gun is actuated to lift the stud away from the surface a predetermined distance sufficient to draw a pilot arc of low thermo capacity. Thereafter, the current of the arc is increased to a degree sufficient to cause a melting of the end of the stud and the surface to which it is to be welded, whereafter the stud is plunged into the melted surface and the molten metal is allowed to solidify.

Whenever steel is welded in a gun such as the gun 10, a ceramic ferrule is fitted around the end of the stud to enclose the weld area, and a flux material is caused to burn by the arc and fill the chamber with the products of such combustion. The chamber within such ferrule is relatively small and is employed for the dual purpose of serving as a mold to control the shape and uniformity of the weld metal fillet, and is also employed to enable the burned flux material to purge the interior of the ferrule of natural atmosphere and thus prevent oxidation of the molten metal. In the welding of steel with internal flux, it has been found advantageous to vent the abutment end of the ferrule in order to allow the burned flux material to sweep outwardly through the vents and carry the products of combustion as well as the natural atmosphere out of the chamber defined by the interior of the ferrule.

Quite naturally, whenever it was desired to weld aluminum studs much the same practice was attempted, but without material success. Aluminum is quite generally the flux employed with steel, and it was found impractical to attempt to flux aluminum with aluminum and no other useful flux has been found for such purpose. To allow the stud and member to which the stud is to be welded to serve as a self-flux is unsatisfactory, because the aluminum has such a tremendous affinity for oxygen that more oxygen simply entered into the chamber and caused a contamination of the weld metal.

Reference to FIGURE 3 will illustrate in some detail the structure which has been devised and proven to be exceptionally useful for carrying forth the improved process which has been discovered as a superior means of providing a gas shield atmosphere continuously washing over and through the weld area before, during and after the arc initiation and welding. Legs 16 are employed to carry the shielding device at the proper position with respect to the stud holding chuck 12.

The preferred embodiment of the gas shield 14 is composed of a base portion 18 with an insulating top member 21. The base member 18 has a base surface 19 which is shaped to fit complemental to a workpiece surface to which a stud is to be welded. In the illustration this surface 19 is a flat plane surface.

A stud, such as the stud 26 illustrated in FIGURE 4, carried by the chuck 12, is directed toward a workpiece surface 17 through the gas shielding portion of the shield 14.

Fundamentally, the shielding area of any shield embodying the principles of this invention establishes a weld chamber which encompasses the weld area of the stud to the workpiece and a flow of gas is directed into the welding chamber area in a sweeping action from all directions encompassing the weld area and then is exhausted away from the weld area in a direction which does not disturb this flow of gas to the weld area. Note that the flow of gases into this weld area is just reverse of the described purging of the natural atmosphere from within the ferrule when the ferrous welding is carried forth.

As a practical means of securing this desired inward sweeping and lateral exhaust of the inert shielding gas, there is provided an opening 22 vertically through the member 21 and a mated opening 23 through the member 18. An annular recess 24 around the opening 23 at the top surface of the member 18 is capped over by the bottom surface of the member 21 and hence defines a retaining recess cavity in which an O-ring 25 resides.

This O-ring 25 serves a very desirable dual function. Reference to FIGURE 4 will show a ferrule 35 held in the chamber opening 23 by frictional engagement of the O-ring 25. The compression of the O-ring 25 furthermore provides a very effective gas seal to prevent the passage of gases around the exterior surface of the ferrule. A gas manifold 27 which encompasses the opening 23 at the base surface 19 delivers gas from vertical feed passageways 29 and distributes gas fully around the periphery of the ferrule 35. Gas is distributed to the vertical feed passageways from an annular duct recess 28 formed in the lower surface of the member 21, which duct recess 28 in turn is fed from a chamber 48 associated with a valve in that body structure 30.

Although the valving mechanism illustrated in the drawings is believed to be a novel and very desirable portion of the structure of this invention, an understanding of the construction and operation of this valve is not essential to an understanding of the improved directional flow of gases through the manifold and chamber structure which directs the gases in the new and novel process of this invention. Hence, the valve structure will be explained in more detail later. Suffice it to say that the valve inlet body 30 provides a flow of gas to the annular duct recess, and the gas is then fed to the vertical feed passageways 29 to the manifold 27 and hence provides an annular distribution of the gas around the peripheral edge of the ferrule 35.

The ferrule 35 has a base end 38 with vents 39 at the base end. Internally, the ferrule has a stud passageway 36 which is dimensioned to define a port vent space between the surface of the stud and the surface of the passageway 36, and hence, gas which is fed into the ferrule through the vents 39 may escape upwardly through the port outlet established by the oversize of the stud passageway 36.

The ferrule has an enlarged fillet chamber 37, and is conventional with most ferrule devices, and this enlarged chamber is provided to aid in the uniform molding of the melted metal of the stud and the member to which the stud is welded, and to prevent the splashing of droplets of the metal away from the weld area.

As thus far described, it will be seen that the gas shield 14 will provide a flow of gas which is directed from an annular direction radially into the weld area and the gas is then directed to escape upwardly along the stud 26. Hence, there is no interruption of flow of gas in any direction by reason of a stronger stream of gas flowing from another direction. The converging flow of gas sweeping together tends to form a rising column and this rising column is readily vented along the stud, and hence the products of combustion, if there be any, and the sweeping gases are moved away uniformly and efficiently. The very movement of the exhaust gases through the stud passageway 36 prevents the entrance of natural atmosphere, and any irregularities in the ferrule end 38 or the base surface 19 will cause some leakage outwardly to also prevent the inward passage of natural atmosphere.

It has been found that this controlled movement of inert atmosphere sweeping inwardly along the surface to which the stud is to be welded and escaping upwardly from the weld area in a rising column produces a uniform weld of exceedingly fine character.

Not only is the direction of movement of the gas essential to the assurance of a good aluminum weld, but it also must be positively established that all of the natural atmosphere is purged from the weld area prior to the beginning of even the low power pilot arc previously described. Furthermore, the assurance of complete purge must be available without dependency upon human judgment, otherwise failures will result. To produce the assurance and to cause a complete purge before the pilot arc of the weld is commenced, a valving mechanism is provided which is interrelated with the natural physical movements of the welding operation to cause the gas to flow momentarily before any welding operation can take place. Those who are acquainted with the use and operation of guns such as the welding gun 10 will recognize that the stud 26 must be brought into contact with the workpiece 17 before an arc can be drawn. By the arrangement of the structure illustrated in the drawings, the flow of gas to purge the welding chamber area takes place before the arc is initiated.

Reference to the FIGURES 3 and 4 will indicate at a glance the preferred embodiments of the valving structure according to the purpose to be served. This valved inlet body 30 has a threaded hose fitting surface 31 to which a hose 49 is connected. The hose 49 is a conventional hose leading from a source of inert gas, usually a high-pressure gas cylinder. The throat through the hose fitting in FIGURE 3 is of large diameter in order to be non-restricting and hence allow the entire hose to act as a reservoir. In FIGURE 4 the throat in the hose fitting is restricted and hence is an orifice and prevents the hose from releasing the reservoir of gas rapidly.

A bore 32 extends axially through the inlet body 30 and has an enlarged chamber portion 40.

A valve stem 33 is provided with an enlarged head portion 34. An O-ring 46 encompasses the stem 33 just below the enlarged head 34. A spring 45 is positioned within the enlarged portion 40 and pressed downwardly upon the head 34 to urge the head 34 against the O-ring 46 and hence to seal the bore 32 against the passage of gas from the enlarged portion 40 into the smaller portion thereof. Hence, in the normal condition, the O-ring 46 will effectively seal the valve structure against the flow of gas therethrough.

The valve stem 33 is of a length which permits a slight portion of the end of the valve stem to project through a bore 41 in the member 18 and extend beyond the base surface 19. Hence, whenever the gas shield 14 is positioned to present the base surface 19 to the surface of a workpiece, the stem 33 is forced to retract back into the bore 32 against the urge of the spring 45. Gas then passes around the head 34 and the O-ring 46 and into the reduced portion of the bore 32 surrounding the stem 33. Escape of gas to the atmosphere around the stem 33 through the bore 41 is effectively prevented because the surface 19 is seated upon a mated workpiece surface. However, a large port 47 permits the escape of such gas into the chamber 48 and hence the gas is directed into the manifolding system previously described.

There are some types of stud metal and welding conditions wherein it is desirable to have a thorough purge of the interior area surrounding the stud and this may be accomplished quite readily by using a short length of hose from the supply tank to the hose fitting 31 and then employing the unrestricted throat as shown in FIGURE 3. Thus when the valve is opened the entire hose acts as a reservoir and will provide a large volume of gas in a rapid purging surge.

On the other hand it has been found that in work areas where long lengths of hose is needed such unrestricted opening will allow the gas from the hose to surge for too long a length of time. Thus the throat opening in the modification shown in FIGURE 4 may be calibrated to fit a general length of hose to be employed and thus cause a restriction of the gas flow and prevent a surge.

Hence, in using the FIGURE 3 embodiment whenever the valve stem 33 is depressed to allow the gas flow to begin, a surge of shielding gas immediately sweeps through the feeding system to purge any natural atmosphere which may have found its way into the feeding system. This surge takes place even while the shield 14 is being finally seated upon the weld surface and continues after such seating to completely fill the weld chamber, both outside and within the ferrule, whenever, a ferrule is used. Furthermore, the flowing does not cease after the initial surge has come to an end by equalization of pressure to atmosphere, but continues flowing from the source to provide a continuous flow of the shielding gas during and after the arc welding process. Hence, the entire weld cycle is completely shielded through to the time that the metal actually cools back to the solidified state at which time oxidation no longer can be harmful. The restricted orifice will be used whenever hose length and welding conditions indicates it to be desirable.

Although the invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Atmospheric control apparatus for drawn-arc welding, comprising, a hood body having a base surface, wall surfaces defining a chamber opening from said base surface into said hood body, said chamber being substantially closeable by abutment of said base surface against a workpiece to which a welding attachment is to be made, a passageway from the exterior of said hood body to said chamber defined by wall surfaces shaped to receive a weldable element, exhaust port means from said chamber to atmosphere, chamber gas inlet means through said wall surfaces of the chamber, valve means in said gas inlet means, valve actuation means, a gas supply source of predeterminable maximum pressure, a length of support conduit between said source and said valve, said conduit having internal volume to hold a quantity of compressed gas at said maximum pressure which will expand at atmospheric pressure to a volume greater than the combined volume of the said chamber and all gas conducting members to and from the chamber, including the said supply conduit, and an orifice throat in said valve of a size related to said length of hose to thereby reduce the flow from longer hoses acting as larger reservoirs, whereby shielding gas will flood the chamber and escape through said outlet port.

2. Atmospheric control apparatus for drawn-arc welding, comprising, a hood body having a base surface, wall surfaces defining a chamber opening from said base surface into said hood body, said chamber being substantially closeable by abutment against said base surface of a workpiece to which a welding attachment is to be made, the hood body including a passageway from the exterior of said hood body to said chamber defined by wall surfaces shaped to receive a weldable element, exhaust port means from said chamber to atmosphere, the hood body including a gas distribution manifold having inlet port means to said chamber directing gas flow toward the center axis of said chamber from at least two opposed directions along the plane of the base surface, said hood body also including an enlarged valving cavity and a passageway connecting the cavity with the chamber, and a valve member extending into the cavity and selectively closing the cavity to manifold passageway, said valve member including an actuation stem extending through and past the base surface for opening the valve whenever the base surface is abutted against workpiece, whereby shielding gas will flood the chamber and escape through said exhaust port.

3. Atmospheric control apparatus for drawn-arc welding, comprising, a hood body having a base surface, wall surfaces defining a chamber opening from said base surface into said hood body, said chamber being substantially closable by abutment against said base surface of a workpiece to which a welding attachment is to be made, a passageway from the exterior of said hood body to said chamber defined by wall surfaces shaped to receive a weldable element, exhaust port means from said chamber to atmosphere, a gas distribution manifold having inlet port means to said chamber directing gas flow toward the center axis of said chamber from at least two opposed directions along the plane of the base surface, a gas supply system to said manifold including a valve means, and a valve actuation trigger having a closed valve position extending beyond said base surface and an open valve position retracted to said base surface, whereby said valve is actuated to an open condition as a resultant of physical placement of the base surface against the surface of a workpiece.

4. Atmospheric control apparatus for drawn-arc welding, comprising, a hood body having a base surface, wall surfaces defining a chamber opening from said base surface into said hood body, said chamber being substantially closable by abutment against said base surface of a workpiece to which a welding attachment is to be made, the hood body including a passageway from the exterior of said hood body to said chamber defined by wall surfaces shaped to receive a weldable element, exhaust port means from said chamber to atmosphere, at least a portion of a weldable element defining at least a portion of said exhaust port means when said weldable element is positioned in said chamber, a gas distribution manifold having inlet port means to said chamber directing gas flow toward the center axis of said chamber from at least two opposed directions along the plane of the base surface, a gas control including a gas inlet adapted to receive a gas supply line, a valve means interconnected between said inlet and said manifold, and said valve means including a valve actuation stem projecting past said base surface to open said valve as a resultant of physical placement of the base surface against the surface of a workpiece.

5. Atmospheric control apparatus for drawn-arc welding, comprising, a hood body having a base surface, an opening from said base surface through said body, an annular resilient seal member lying along the inner opening wall a distance from said opening at the base surface, means holding said seal against displacement in said opening, a ferrule comprising a sleeve having a bore therethrough, said sleeve having a base end portion and a top end portion, the exterior surface of said top end portion proportioned to removably fit in gas tight sealing engagement with a holding grip in said resilient seal member, said ferrule bore within the top end portion having a cross-section enough larger than the member to be welded to permit it to pass through with a slight gas escape port space therearound, the bore at the base end portion being enlarged to provide a narrow peripheral molding chamber around the welding area of the member extending therethrough, the ferrule sleeve proportioned to present the end of the base portion flush with the plane of the hood base surface, said ferrule sleeve having vent ports at said end of the base portion thereof for the entrance of shielding gas, and a gas feed manifold directing gas into said hood opening around the ferrule in the confined space produced by the sealed ferrule and said opening, whereby gas is forced to jet through said ferrule vent ports and sweep the weld area within said ferrule as it escapes through the escape port space.

6. Atmospheric control apparatus for drawn-arc welding, comprising, a hood body having a base surface, an opening from said base surface through said body, an annular resilient seal member lying along the inner opening wall a distance from said opening at the base surface, means holding said seal against displacement in said opening, a ferrule comprising a sleeve having a bore therethrough, said sleeve having a base end portion and a top end portion, the exterior surface of said top end portion proportioned to removably fit in gas tight sealing engagement with a holding grip in said resilient seal member, said ferrule bore within the top end portion having a cross-section enough larger than the member to be welded to permit it to pass through with a slight gas escape port space therearound, the bore at the base end portion being enlarged to provide a narrow peripheral molding chamber around the welding area of the member extending therethrough, the ferrule sleeve proportioned to present the end of the base portion flush with the plane of the hood base surface, and said ferrule sleeve having vent ports at said end of the base portion thereof for the entrance of shielding gas, a gas feed manifold directing gas into said hood opening around the ferrule in the confined space produced by the sealed ferrule and said opening, a gas feed system to said manifold, a valve in said feed system, said valve having a stem projectable from said base surface, resilient means urging said valve to a closed condition with the said stem projecting from said base surface, said valve having an open condition established by movement of said stem to a flush condition with respect to said base surface, whereby said valve will be opened by the seating movement of the control apparatus upon a surface.

7. The process of stud welding by a drawn arc, comprising the steps of, touching a first member to a second member at a position where a weld union is desired, surrounding said position where a weld union is desired with a hood, thereafter first passing an initially surging flow of inert gas radially toward the weld area within said hood and allowing the gas to move axially in contact with said first member, and thereafter to escape away from said weld area through escape ports in said hood, maintaining said flow at a reduced pressure from an orifice constricted source, and after a flow of gas has expunged all atmosphere from the weld area and while the gas continues to flow under such reduced pressure establishing an electrical potential between the members to be welded, then separating the members to draw an arc, holding an arc until the members have melted in said flowing gas, and finally plunging said members together and allowing the weld current to cease, said gas flow being continued until the weld metal has solidified.

8. In a stud welding gum having at least one leg paralleling a stud chuck the combination of;
(a) A hood body secured to a leg and projecting laterally therefrom;
(b) The body including a stud receiving aperture in axial alignment with the chuck;
(c) The body including a work abutment face;
(d) The body also including an annular internal manifold surrounding the aperture;
(e) The body also including passages each extending from the manifold to an outlet communicating with an aperture near the abutment face;
(f) The body defining an internal valve cavity having an inlet and an outlet communicating with a supply passage connecting the cavity to the manifold;
(g) A valve stem mounted in the body for rectilinear movement and having a valving end for closing an inlet to the supply passage in the cavity and an actuation end; and,
(h) Resilient means biasing the stem into a normally closed position with the actuation end projecting past the face and yieldable to permit the stem to be shifted rectilinearly inwardly to project further into the cavity to open the supply passage inlet.

9. The device of claim 8 wherein the cavity inlet is a constricting orifice.

10. In a stud welding gun having at least one leg paralleling a stud chuck the combination of;
(a) A hood body secured to a leg and projecting laterally therefrom;
(b) The body including a stud receiving aperture in axial alignment with the chuck;
(c) The body including a work abutment face;
(d) The body also including an annular internal manifold surrounding the aperture;
(e) The body also including passages each extending from the manifold to an outlet communicating with an aperture near the abutment face;
(f) The body defining an internal valve cavity having an inlet and an outlet communicating with a supply passage connecting the cavity to the manifold;
(g) A valve stem mounted in the body for rectilinear movement and having a valving end for closing an inlet to the supply passage in the cavity and an actuation end;
(h) Resilient means biasing the stem into a normally closed position with the actuation end projecting past the face and yieldable to permit the stem to be shifted rectilinearly inwardly to project further into the cavity to open the supply passage inlet; and,
(i) An annular gasket carried by the body and surrounding the aperture for fluid tight gripping engagement with a ferrule.

11. In a stud welding gun having at least one leg paralleling a stud chuck the combination of;
(a) A hood body secured to a leg and projecting laterally therefrom;
(b) The body including a stud receiving aperture in axial alignment with the chuck;
(c) The body including a work abutment face;
(d) The body also including an annular internal manifold surrounding the aperture;
(e) The body also including passages each extending from the manifold to an outlet communicating with an aperture near the abutment face;
(f) The body defining an internal valve cavity having an inlet and an outlet communicating with a supply passage connecting the cavity to the manifold;
(g) A circular valve stem carried by the body for rectilinear movement along an axis generally paralleling the chuck axis and projecting through the supply passage with a valving end in the cavity;
(h) Said body including a valve seat surrounding the supply passage inlet;
(i) The valve stem including a seat surrounding the passage inlet;
(j) An annular seal around the stem and between the shoulder and the seat;
(k) A spring in the cavity and between the shoulder and the body to bias the seal gainst the seat; and,
(l) Said stem projecting past the body face for valve actuating abutment with a work surface.

12. In a stud welding gun having at least one leg paralleling a stud chuck the combination of;

(a) A hood body secured to a leg and projecting laterally therefrom;
(b) The body including a stud receiving aperture in axial alignment with the chuck;
(c) The body including a work abutment face;
(d) The body also including an annular internal manifold surrounding the aperture;
(e) The body also including passages each extending from the manifold to an outlet communicating with an aperture near the abutment face;
(f) The body defining an internal valve cavity having an inlet and an outlet communicating with a supply passage connecting the cavity to the manifold;
(g) Valve stem means mounted in the body for rectilinear movement and having a valving end for closing an inlet to the supply passage in the cavity and an actuation end projecting past the hood face when the stem means is in a closed position;
(h) Biasing means urging the stem means normally into the closed position;
(i) A stud in the chuck;
(j) A ferrule around the stud; and,
(k) A seal carried by the body at the periphery of the aperture and in peripheral sealing abutment with the ferrule.

References Cited in the file of this patent
UNITED STATES PATENTS

| | | |
|---|---|---|
| 2,315,502 | Crecca et al. | Apr. 6, 1943 |
| 2,491,479 | Dash | Dec. 20, 1949 |
| 2,727,123 | Gregory | Dec. 13, 1955 |
| 2,790,066 | Haynes et al. | Apr. 23, 1957 |